United States Patent [19]

Plummer

[11] 4,282,548

[45] Aug. 4, 1981

[54] METHOD AND APPARATUS FOR MEASURING AND/OR SETTING LENS FOCUS DISTANCE

[75] Inventor: William T. Plummer, Concord, Mass.

[73] Assignee: Polaroid Corporation, Cambridge, Mass.

[21] Appl. No.: 140,086

[22] Filed: Apr. 14, 1980

[51] Int. Cl.$^3$ .............................................. H04N 7/02
[52] U.S. Cl. .................................. 358/107; 358/227; 356/125
[58] Field of Search ................. 358/107, 227; 356/125

[56] References Cited

U.S. PATENT DOCUMENTS

| | | |
|---|---|---|
| 1,241,612 | 10/1917 | Emerson . |
| 3,323,417 | 6/1967 | Grey et al. . |
| 3,492,652 | 1/1970 | Heerden . |
| 3,619,067 | 11/1971 | Howland . |
| 3,652,164 | 3/1972 | Faramarzpour . |
| 3,652,165 | 3/1972 | Candidus, Jr. . |
| 3,904,294 | 9/1975 | Gold et al. . |
| 3,967,108 | 6/1976 | Hollis . |
| 3,967,110 | 6/1976 | Rogers et al. . |
| 4,011,446 | 3/1977 | Swanberg . |
| 4,070,115 | 1/1978 | Humphrey . |

OTHER PUBLICATIONS

Smith, "Modern Optical Engineering", 1966.

*Primary Examiner*—Robert L. Richardson
*Attorney, Agent, or Firm*—Francis J. Caufield

[57] ABSTRACT

Lens testing apparatus and method by which the focus of a lens can be set to sharply image a distant object in a select focal or reference plane. The apparatus comprises a conventional television camera on which a lens can be mounted in a predetermined manner to focus light from a collimated light beam onto the photosensitive surface of the television camera tube. As the lens is adjusted, the area of the pattern of illumination formed by the lens on the photosensitive surface changes in accordance with the state of focus of the lens. The television camera scans the illuminated area and produces a video signal which is received by electronic circuitry that is operative to indicate the size of the area of the pattern of illumination as the lens state of focus is changed. The smallest area indicated corresponds to the best focus adjustment for the lens. Lens focal length also can be determined with the apparatus by making appropriate measurements when the smallest area is indicated.

22 Claims, 8 Drawing Figures

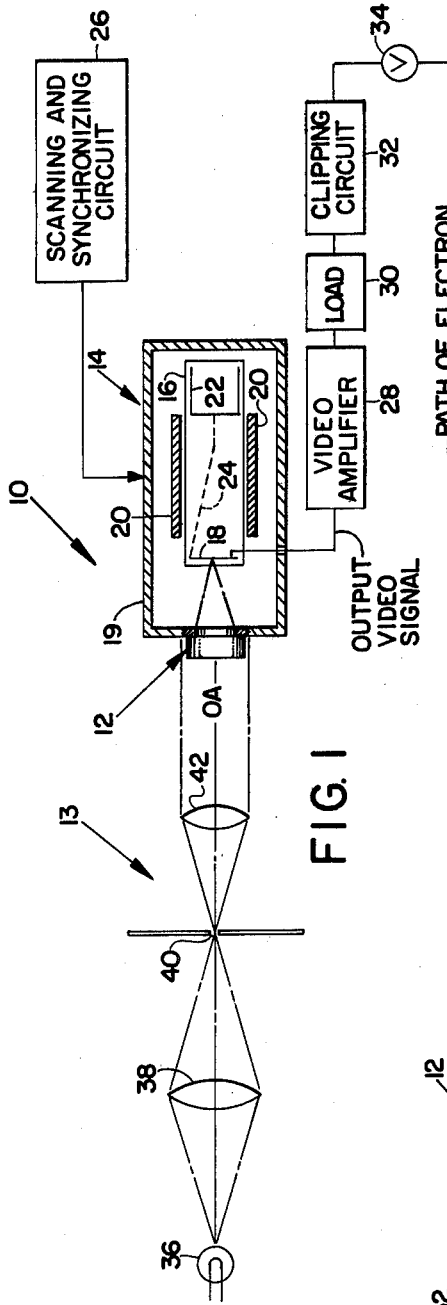
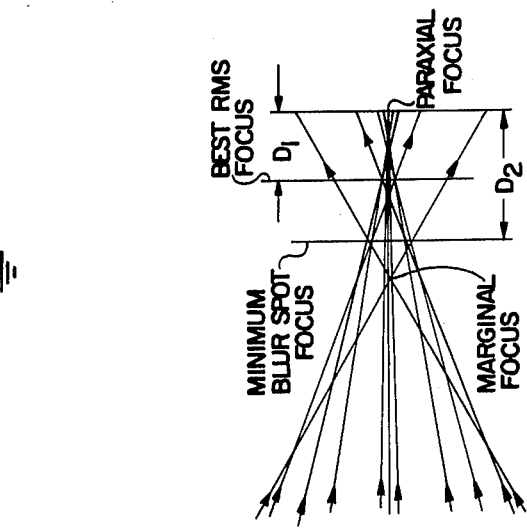
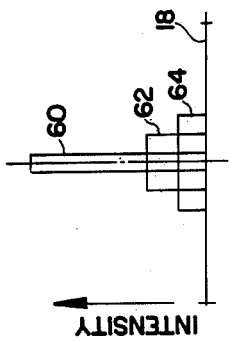
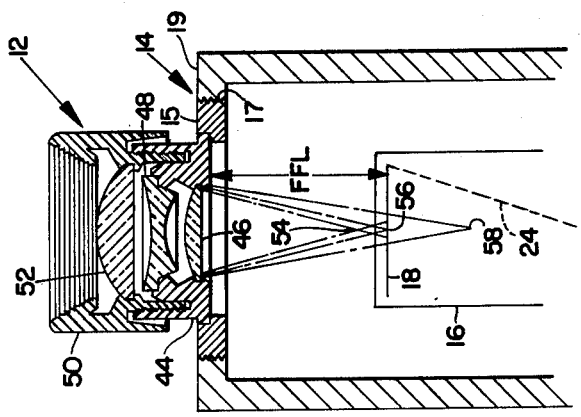

METHOD AND APPARATUS FOR MEASURING AND/OR SETTING LENS FOCUS DISTANCE

BACKGROUND OF THE INVENTION

1. Field of the Invention

This invention relates to lens testing apparatus by which the focus of a lens can be set to sharply image a distant object on a select focal or reference plane and by which the focal length of a lens can be determined.

2. Description of the Prior Art

In the practice of the optical arts, it is of such fundamental importance to be able to measure the focal length of a lens and to be able to set the focus of a lens for best imagery in a given reference plane that those skilled in the art have developed a number of apparatus and methods for these purposes.

One of the most-known and accurate methods, which is particularly suitable for measuring medium focal length lenses, employs the nodal slide. The essential part of the nodal slide is the provision for moving the lens system longitudinally with respect to a vertical axis of rotation. The vertical axis is mounted so that it may be positioned longitudinally with respect to a collimator of appropriate size. Usually the object for the collimator is a very small point source set at the focal point of the collimator. In use, a magnifier or microscope is set up approximately at the lens focal plane. The lens under test is then moved backward and forward along the nodal slide until rotation of the nodal slide through a small angle produces no sidewise shift in the image seen through the microscope. A measure of the focal length is then the distance between the axis of rotation of the nodal slide and the appropriate focal point located with the magnifier or microscope. The focal length can also be specified with respect to the vertex of the rear surface (this distance is known as the "back focal length") or to any other convenient part of the lens. When the focal length is specified by the distance between the focal point and some convenient reference point on a lens mount, it is understood that this is the "flange focal distance". On the other hand when the focal length is specified as the distance between the focal point and the second nodal point of the optical system, the "effective focal length" has been specified. For a more detailed description of the nodal slide method and apparatus, reference may be had to standard textbooks in the optical field such as "Modern Optical Engineering", by Warren E. Smith, published by McGraw-Hill Book Co., New York, 1966.

Another basic method for locating the focal point of a lens employs auto-collimation. Here an illuminated target and a screen are placed side by side near the estimated focus of the lens under test, and a plane mirror is placed in front of the lens so as to reflect light from the target back into the lens. The target and screen are moved until the reflected image of the target is sharply imaged on the screen. Both screen and target then lie in the focal plane. For accurate work, an auto-collimating microscope produces excellent results. Again, "Modern Optical Engineering" by Smith may be referred to at pages 434 and 435 for a more detailed description of auto-collimation.

In photograhic cameras, a popular method for setting the focus of the lens for best imagery at the film plane of the camera employs a ground-glass plate. Here a suitable target is located at a reference distance forward of the camera, and the image formed by the lens on the ground glass plate is observed through the use of a microscope. The lens focus is adjusted until the image shows maximum quality as judged by the observer. However, in this method, the image-quality judgment is subjective and there can be significant variations among different observers and with the same observer at different times. Although this ground-glass technique is rather simple, the possibility for error because of observer subjectivity may make it undesirable in a particular photographic application.

All of the foregoing methods and apparatus are most suitable for use in laboratory settings where rapid determination of focal length or setting of lens focus is not required and also require well-trained observers to carry out the measurements. Because of these limitations, other apparatus have been developed which are more suitable for use in high volume production settings requiring both speed and accuracy. Examples of apparatus suitable for this purpose are disclosed and described in, for example, U.S. Pat. No. 3,323,417 issued to David S. Grey et al. on June 6, 1967 and entitled "Testing Apparatus for Optical Lenses" and U.S. Pat. No. 3,619,067 issued to Bradford Howland et al. on Nov. 9, 1971 and entitled "Method and Apparatus for Determining Optical Focal Distance". The apparatus described in these two patents operate to determine the axial distance from some convenient point in or on a lens to the minimum on-axis blur circle which is formed by the lens. The minimum blur size is indicative of the focus position at which the largest amount of energy from the lens passes through the minimum sized area when the lens is illuminated by a collimated source. It appears that these apparatus can be adapted to permit setting of lens focus for best imagery in a select reference plane.

U.S. Pat. No. 3,904,294 issued to Nathan Gold et al. on Sept. 9, 1975 and entitled "Automated Lens Testing Apparatus" discloses lens testing equipment by which acceptance testing of photographic objective lenses is determined by evaluating the optical performance at several representative locations in a reference plane as lens focus is adjusted to determine the focus setting at which the performance at each of the locations meets certain minimum standards as based on the contrast transfer efficiency of a target having a predetermined spatial frequency at each test location. With this apparatus, best focus setting can be determined or the lens can be rejected for failure to meet minimum standards.

Although the prior art discloses methods and apparatus appropriate to the tasks of focal length measurement and setting lens focus, it is evident that the need for such test apparatus in the optical arts is continual, and it is therefore a primary object of the present invention to provide such apparatus.

It is another object of the present invention to provide novel test apparatus and methods for setting lens focus and measuring lens focal length through the use of a novel combination of readily available components and steps.

Other objects of the invention in part will be obvious and in part will appear hereinafter. The invention accordingly comprises the methods and apparatus possessing the construction, combination of elements, and arrangement of parts which are exemplified in the following detailed description.

SUMMARY OF THE INVENTION

This invention relates to lens testing apparatus and methods by which the focus of a lens can be set to sharply image a distant object in a select focal or reference plane.

The apparatus of the invention comprises means for defining a photosensitive surface having an electrical characteristic which locally varies in accordance with the intensity of illumination incident thereto and for providing an analog electrical signal that varies in a predetermined sequence in accordance with the local value of the electrical characteristic of the photosensitive surface.

Additionally included in the invention are means for mounting a lens, the focus of which is to be set, in a predetermined manner with respect to the photosensitive surface such that light emerging from the lens can impinge on the photosensitive surface and form thereon a pattern of illumination whose area varies in accordance with the state of focus of the lens being tested.

Means for providing a source of illumination are included in the apparatus of the invention. Illumination is directed at the lens and effectively originates from the predeterminated object distance for which the lens focus is to be set. The photosensitive surface, the lens mounting means, and the means for providing the source of illumination are arranged with respect to one another so that the best focus of the lens for the predetermined object distance occurs when the area of the pattern of illumination formed by the lens on the photosensitive surface is smallest.

Additionally included in the invention are means for receiving the analog electrical signal and in response thereto providing an output response which is proportional to the size of the area of the pattern of illumination formed on the photosensitive surface. In this manner, the state of focus of the lens can be determined as the lens focus is adjusted for minimum area.

The apparatus is also readily adapted to measure lens focal length and novel methods are included in which the apparatus of the invention is employed to determine lens focal length and set best lens focus.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

FIG. 1 shows a lens in a diagrammatic view of the invention in which parts thereof are shown in section;

FIG. 2 is an enlarged section view of part of the test apparatus of the invention of FIG. 1 shown in combination with an enlarged section view of the lens of FIG. 1 which can be tested by the invention;

FIG. 3 is a diagrammatic view showing possible image patterns which can be formed on a part of the invention and illustrates also how those image patterns are scanned by part of the invention;

FIG. 4 is a diagrammatic representation of the light intensities of the image patterns formed in FIG. 3;

FIG. 8 is a diagrammatic drawing representing an example ray trace for a lens which could be tested by the apparatus of the invention.

DESCRIPTION OF THE PREFERRED EMBODIMENT

Figure 5:
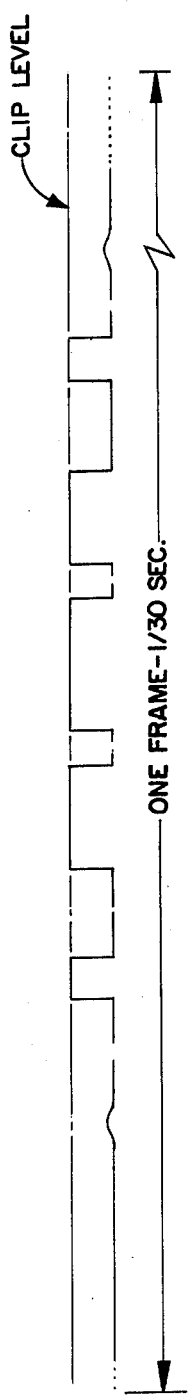
FIG. 5 is a diagrammatic representation of a signal which is generated by the apparatus of the invention as one of the image patterns illustrated in FIG. 3 is scanned in a predetermined sequence and rate.

Referring now to FIG. 1, there is shown at 10 the preferred embodiment of the lens test apparatus of the invention by which the focus of a lens 12 can be set for best imagery of a distant object in a select focal plane. The apparatus 10 comprises an illumination system, which is generally designated at 13, for providing a collimated source of illumination which is directed at the lens 12 and an electro-optical system for detecting and indicating the state of focus of the lens 12.

The electro-optical system comprises a conventional television camera 14 the lens of which has been removed and replaced by the lens 12 in a manner to be described. Included in the television camera 14 is a conventional television camera tube 16 which may be either an orthocon or vidicon, a scanning and synchronizing circuit 26, a video amplifier 28, and an electrical resistance load which is designated at 30. A conventional signal clipping circuit 32 and DC voltmeter 34 are also included in the electro-optical system and cooperate with the television components thereof in a manner to be described.

The television camera tube 16 includes a photosensitive surface 18 which serves as a surrogate for the actual focal plane for which the best focus of the lens 12 is to be set. The lens 12 is mounted forward of the photosensitive surface 18 by a predetermined distance that is equal to the flange focal distance, FFL (see FIG. 2), at which the lens 12 is intended to be used. The flange focal distance, FFL, could, for example, be the distance between the rear mounting surface of the lens 12 and a film plane in a photographic camera.

Mounting of the lens 12 in the television camera 14 may be accomplished in a well-known manner. By television industry convention, many television cameras include what is known as a "C-lens mount" that is adapted to receive complementary threaded lenses or adapters. An adapter ring 15 (FIG. 2) is configured on one side to receive the lens 12 and is provided with external threads which fit the C-lens mount of the television camera 14. The C-lens mount is not shown in detail but is represented diagrammatically by threaded aperature 17 located in a forward wall 19 of the television camera 14 as shown in FIG. 2.

The illumination system of the apparatus 10 comprises a lamp 36 which is imaged in a well-known manner onto a pinhole 40 by a converging lens 38. Light rays emerging from the pinhole 40 are collimated in a well-known manner into a parallel bundle of rays by a condenser lens 42 and are directed at the lens 12. The parallel bundle of rays thus represent to the lens 12 a distant object located at infinity.

The lens 12 may be any of a number of well-known types but as illustrated represents a photographic objective such as a Cooke Triplet or other similar multi-element type such as that described, for example, in U.S. Pat. No. 3,558,218 issued to David S. Grey on Jan. 26, 1971 and entitled "Three-Element Telephoto Objective Lens". As seen in FIG. 2, the lens 12 comprises a rear lens mount 44 in which are fixedly mounted a rearwardmost converging lens element 46 and a diverging lens element 48. In use, the rear lens mount 44 fixedly mounts to a lens board. A forward lens mount 50 includes a converging lens element 52 which is fixedly mounted therein. The forward lens mount 50 rotates with respect to the rear lens mount 44 through the use of a well-known screw thread arrangement.

The lens 12 is corrected for the usual aberrations important in photographic work including spherical, coma, astigmatism, distortion and chromatic types. Focus of the lens 12 is achieved by rotating the forward lens mount 50 to axially displace the forwardmost lens element 52 with respect to the lens elements, 46 and 48, which are fixedly associated with the rear lens mount 44. In this manner, the air spacing between the elements of lens 12 is changed to vary focal length.

In normal use, the focus of the lens 12 is set by first estimating object distance and then manually rotating the forward lens mount 50 to an angular position that is appropriate for the object distance estimated as indicated by a distance scale on the forward lens mount 50. For this reason, it is important to accurately establish the correlation between the distances marked on the forward lens mount 50 and the appropriate angular setting for which the lens 12 will produce the best imagery for the object distance estimated. This may be achieved through the use of the present invention in a manner to be described, but it is to be expressly understood that the present invention can be effectively used with types of lenses other than that represented by the lens 12.

Referring now to FIG. 2, it can be seen that the lens 12 forms the collimated light beam into cones of light rays which generally coverge at different points with respect to the television tube photosensitive surface 18 in accordance with the state of focus or airspacing between the elements of the lens 12. Cones of illumination are formed by the lens 12 because it is a positive, rotationally symmetric lens. FIG. 2 illustrates three possible points of convergence for the cones of illumination formed by the lens 12 for three different focus settings. When the lens 12 is perfectly focused, the cone formed thereby converges to a narrow bundle of rays represented by a point 56 which is located more or less in the plane of the photosensitive surface 18. Point 54 represents an out-of-focus condition in which the narrowest bundle of rays formed by the lens 12 lies ahead of the photosensitive surface 18, and point 58 represents an out-of-focus condition in which the cone converges to a point which is located behind the photosensitive surface 18. The projection of a cone of illumination formed by the lens 12 onto the photosensitive surface 18 forms a generally circular pattern of illumination on the photosensitive surface 18 as illustrated in FIG. 3. In FIG. 3, the circle 56' corresponds to a state of focus in which the cone of illumination formed by the lens 12 converges to the point 56 in FIG. 2, circle 58' corresponds to the state of focus in which the cone of illumination formed by the lens 12 is brought to a point of focus corresponding to that designated at 58 in FIG. 2, and the circle 54' corresponds to the state of focus where convergence occurs at the point 54 in FIG. 2. Thus, the area of the circle formed on the photosensitive surface 18 varies in correspondence with the state of focus of the lens 12. Best focus occurs when the area is a minimum—a state of focus corresponding to the minimum sized blur circle or spot that the lens 12 can form for the object distance and focal plane selected. The minimum sized blur spot or circle represents the smallest area through which the largest amount of light passes.

In the foregoing manner, means have been provided for mounting the lens 12, the focus of which is to be set, in a predetermined manner with respect to the photosensitive surface 18 such that light emerging from the lens 12 can impinge on the photosensitive surface 18 and form thereon a pattern of illumination whose area varies in correspondence with the state of focus of the lens 12. Additionally, a source of illumination has been provided which is directed at the lens 12 and effectively originates from a predetermined object distance for which the lens focus is to be set. The object distance which is preferred, for reasons of simplicity, is infinity. The photosensitive surface 18, the arrangement for mounting the lens 12, and the illumination source are preferably arranged with respect to one another so that the best focus of the lens 12, i.e. the minimum sized blur circle for the selected object distance, occurs when the area of the pattern of illumination formed by the lens 12 on the photosensitive surface 18 is smallest.

The area of the circle of illumination formed by the lens 12 can, in a manner to be described, be determined and indicated by the electro-optical system of the invention as the airspacing or state of focus of the lens 12 is adjusted. As indicated earlier, the photosensitive surface 18 of the television camera tube can be either an othocon or a vidicon tube. If an orthocon type tube, the photosensitive surface 18 emits electrons proportionally to the intensity of the illumination incident thereon and, in a well-known manner, forms an electron image corresponding to the pattern of illumination incident on the photosensitive surface 18. This electron image is focused by a magnetic lens onto a second surface where the impinging electrons form an electric potential image, i.e., the voltage to which a given point of the surface is charged is proportional to the intensity of the incident illumination. If the television tube 16 is a vidicon, the pattern of illumination from the lens 12 is formed on a photo-conductive layer, the electrical conductivity of which increases with incident illumination. The increased conductivity of those parts of the layer which are brightly illuminated allows an electric charge to be conducted through the back of the layer, where an electric potential image is thus formed.

In both types of tube, the electric potential image is scanned by an electron beam from an electron gun which discharges the potentials. The discharge currents from the tube form the output video signal from the tube (FIG. 1).

FIG. 1 depicts the television camera tube 16 as a vidicon type which includes an electron gun 22 that projects an electron, raster scanning beam 24 at the photosensitive surface 18 in a predetermined sequence and pattern which is controlled by beam focusing and scanning coils 20. A scanning and synchronizing circuit 26 controls the inputs to the coils 20 so that the scanning beam 24 sweeps across the photosensitive surface 18 at a conventional rate of one frame every one-thirtieth of a second. As the electron beam 24 sweeps across the photosensitive surface 18, it generates a current whose value varies in accordance with the local intensity of the pattern of illumination formed on the photosensitive surface 18. The current, which is identified as the output signal line in FIG. 1, is then fed into a conventional video amplifier 28 and afterwards through the resistive load 30. The output of the resistive load 30 is a voltage whose magnitude varies in a predetermined sequence in accordance with the local value of the intensity of illumination on the photosensitive surface 18. The manner in which the electron beam 24 sweeps across the photosensitive surface 18 is illustrated diagrammatically in FIG. 3. Solid lines with arrows indicate a signal generating sweep while dashed lines with arrows indicate a retrace during which time no signal is generated. Scanning of the pattern of illumination formed on the television tube photosensitive surface 18 thus is much like the eye scanning a page of line text.

The intensity of the illumination formed on the photosensitive surface 18 by the lens 12 depends on the state of focus of the lens 12. If the lens 12 is well focused, then the area over which the light gathered by the lens 12 is distributed is small, and the intensity of the illumination over that area therefore will be high as illustrated by the bar 60 in FIG. 4. When the lens 12 is out of focus, the area over which the light is directed is larger than when in focus and, therefore, the intensity over the corresponding area decreases as illustrated by the bars 62 and 64 in FIG. 4. The intensity level represented by the bar 60 in FIG. 4 corresponds to the state of best focus with minimum area as illustrated at 56′ in FIG. 3. Bar 62 corresponds to the out of focus condition represented by circle 54′ in FIG. 3, and the bar 64 represents the intensity that would prevail with the out-of-focus condition represented by the area 58′ in FIG. 3. As will be appreciated, the total energy collected by the lens 12 does not change with its state of focus. Consequently, the product of the light intensity level and the area over which it is distributed remains a constant regardless of the state of focus of the lens 12, and therefore intensity of the illumination on the photosensitive surface 18 must change in correspondence with the area over which light is distributed.

The television components of the electro-optical system of the apparatus 10 are all conventional and are described in considerable detail in standard textbooks on television art. For example, reference may be had to "Television Engineering Handbook" edited by Donald G. Fink and published by McGraw-Hill Book Co., Inc., New York, 1957.

In the foregoing manner, the apparatus 10 is provided with means for defining a photosensitive surface (18) having an electrical characteristic which locally varies in accordance with the intensity of illumination incident thereto and for providing an analog electrical signal (video signal) that varies in a predetermined sequence in accordance with the local value of the electrical characteristic of the photosensitive surface.

Figure 6:
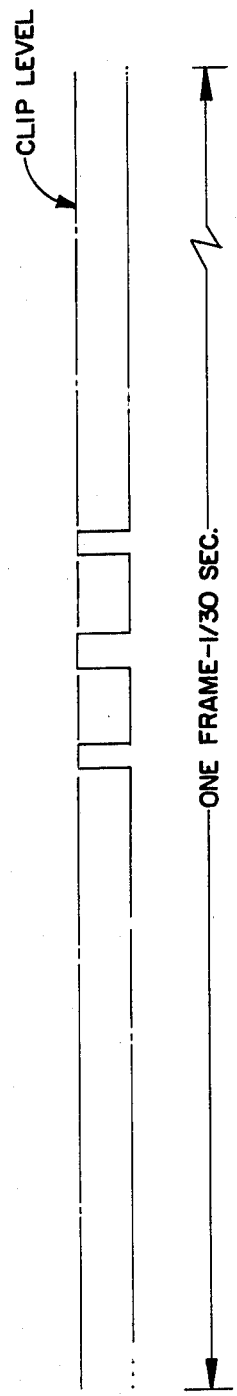
FIG. 6 is similar to FIG. 5 but for a different image pattern than that for FIG. 5.

The voltage output of the resistive load 30 serves as the input to a conventional diode clipping circuit 32 of the type that is found in standard references in the electronics field such as "Digital Electronics for Scientists" by H. V. Malmstadt and C. G. Enke, published by W. A. Benjamin, Inc., New York, 1969. The clipping circuit 32 is arranged to clip the signal output from the load 30 so that the amplitude of the output of the load 30 never goes above a predetermined level regardless of the intensity of the illumination on the photosensitive surface 18. Therefore, the light output of the clipping circuit 32 is a series of pulses which have a maximum predetermined amplitude as the electron beam 24 scans across an area of the photosensitive surface 18 illuminated by the lens 12. FIG. 5 represents the output of the clipping circuit 32 for one frame when the lens 12 is in an out-of-focus condition. There it can be seen that the output signal of the clipping circuit 32 is a series of pulses whose amplitude is never greater than the clip level of the circuit 32 but whose duration changes in accordance with the amount of time required for the electron beam 24 to sweep over a corresponding illuminated area on the photosensitive surface 18. (See circle 58′ in FIG. 3 for example.) Thus, the duration and number of pulses at the output of the clipping circuit 32 increases as the area of illumination formed by the lens 12 increases and vice-versa. FIG. 6 illustrates the output at the clipping circuit 32 for a well focused or best focused condition. Here only a few pulses of limited duration are generated because most of the area of the photosensitive surface 18 is dark when the lens 12 is well or best focused.

Figure 7:
FIG. 7 is a diagrammatic representation illustrating how part of the invention responds as a test lens is adjusted in and out of focus.

The output of the clipping circuit 32 serves as the input to a conventional DC voltmeter 34 which is connected to ground. Because a conventional DC voltmeter will time average its input signal, the output response of the DC voltmeter 34 is proportional to the size of the area of the pattern of illumination formed on the photosensitive surface 18. Therefore, the state of focus of the lens 12 can be determined as the lens 12 is focused simply by observing the output of the DC voltmeter 34. As shown in FIG. 7, the DC voltmeter response is a minimum when the area pulses have a maximum predetermined amplitude and the pattern of illumination is a minimum and increases as the lens 12 is defocused producing a larger area. The frequency response rate of the DC voltmeter 34 is preferably selected to be slower than the sweep rate at which one frame of the photosensitive surface 18 is scanned by the electron scanning beam 24, and the rate at which the focus adjustment of the lens 12 is made is preferably selected to be slower than the sweep scanning rate. Although a conventional frame scanning rate of one-thirtieth of a second has been described, the frame scanning rate can be selected to be any rate which is convenient and need not necessarily be the conventional rate of one-thirtieth of a second so long as the voltmeter frequency response and lens adjustment rate are selected as outlined above.

The apparatus 10 can also be used to measure lens focal length. To do so, the lens, which may be a singlet or a multielement lens with fixed airspace, is simply fixtured in an appropriately structured adapter, such as the adapter 15, which is then screwed in and out of the C-mount of the television camera 14 until such time as the voltmeter 34 indicated that a minimum sized blur spot has been formed by the lens under test. The distance between the photosensitive surface 18 and any convenient location on the test lens is then measured in a well-known manner, and this distance is the focal length from the reference point on the test lens to the photosensitive surface 18.

Certain modifications may be made to the apparatus 10 in accordance with the teachings disclosed herein. For example, the object at which the best focus is to be determined can be something other than infinity. For a finite object distance, the light rays emerging from the pinhole 40 can be made to diverge to appear to originate at the finite object distance by replacing the lens 42 in a well-known manner with a negative or diverging lens of appropriate focal length. In addition, the light source need not be a pinhole as indicated at 40 but can be any appropriate illumination pattern selected, and the invention would still work as disclosed herein to detect the minimum area formed on the photosensitive surface 18. Alternative illumination patterns for example can be an array of pinholes or alternating light and dark lines.

In addition, it is possible to use the measurements on best focus or on focal length obtained using the apparatus 10 to predict where other longitudinal or axial focus positions for lenses ought to be located provided that it can be assumed that the population of lenses to be tested is well behaved and some knowledge about other focus locations has been determined through a design analysis. FIG. 8 illustrates how this can be done. FIG. 8 shows the ray paths near the image plane of a system which has third-order spherical aberration. It is apparent that the minimum diameter blur spot for this system occurs at a point between the marginal focus and the paraxial focus. It can be shown for a lens of this type that the point at which the minimum blur spot is located is three-quarters of the way from the paraxial focus to the marginal focus, say the distance $D_2$. Knowing this, and having made the measurement for the location of the minimum blur spot, it can be appreciated that it would be a simple calculation to determine the paraxial focus location and the marginal focus location with a degree of accuracy which depends on some estimate of how these locations might vary within a particular population of lenses manufactured under assumed conditions. Similarly, the location of the best RMS focus plane can also be determined in the foregoing manner. To estimate expected lens-to-lens variation well-known ray tracing and Monte Carlo techniques can be used.

For convenience in production, it is preferred that the television camera 14 be oriented vertically so that the lenses to be tested can be gravity fed into the adapter 15. Vertical mounting eliminates the need for fixturing to hold the lens to be tested in place and would also improve the time efficiency of the measurement process.

It is to be expressly understood that the steps which are logically used in operating the apparatus 10 comprise methods for setting the focus of a lens for a predetermined object distance or measuring the focal length of the lens as herein described.

Certain changes may be made in the above-described embodiment and method inherent in its use without departing from the scope of the invention, and those skilled in the art may make still other changes according to the teachings of the disclosure. Therefore, it is intended that all matter contained in the above description or shown in the accompanying drawings shall be interpreted as illustrative and not in a limiting sense.

What is claimed is:

1. Apparatus for setting the focus of a lens for a predetermined object distance, said apparatus comprising:
    means for defining a photosensitive surface having an electrical characteristic which locally varies in accordance with the intensity of illumination incident thereto and for providing an analog electrical signal that varies in a pedetermined sequence in accordance with the local value of said electrical characteristic of said photosensitive surface;
    means for mounting a lens, the focus of which is to be set, in a predetermined manner with respect to said photosensitive surface such that light emerging from the lens can impinge on said photosensitive surface and form thereon a pattern of illumination whose area varies in accordance with the state of focus of the lens;
    means for providing a source of illumination which is directed at the lens and effectively originates from the predetermined object distance for which the lens focus is to be set, said photosensitive surface, said mounting means, and said illumination source providing means being arranged with respect to one another so that the best focus of the lens for the predetermined object distance occurs when the area of the pattern of illumination formed by the lens on said photosensitive surface is smallest; and
    means for receiving said analog electrical signal and in response thereto providing an output response proportional to the size of the area of the pattern of illumination formed on said photosensitive surface so that the state of focus of the lens can be determined as the lens focus is adjusted.

2. The apparatus of claim 1 wherein said first stated means comprises a television camera tube which includes said photosensitive surface on which light emerging from the lens impinges to form thereon said pattern of illumination and electronic circuit means for scanning said photosensitive surface in a pedetermined pattern and rate to provide said electrical signal.

3. The apparatus of claim 1 wherein said last stated means comprises:
    (a) clipping circuit means for receiving said electrical signal as an input and providing an output signal whose instantaneous value is limited to a predetermined level; and
    (b) a DC voltmeter arranged to receive said clipping circuit means output signal, said DC voltmeter being operative to time average said clipping circuit means output signal and display said value of said time averaged signal, said displayed value of said time averaged signal being proportional to the area of said pattern of illumination formed on said photosensitive surface.

4. The apparatus of claim 3 wherein said first stated means recited in claim 1 comprises a television camera tube which includes said photosensitive surface on which light emerging from the lens impinges to form thereon said pattern of illumination and electronic circuit means for scanning said photosensitive surface in a predetermined pattern and rate to provide said electrical signal.

5. The apparatus of claim 4 wherein said DC voltmeter is selected so as to have a frequency response that is slower than said predetermined rate at which said television camera tube photosensitive surface is scanned and said predetermined scanning rate is selected to be faster than the rate at which the lens focus is adjusted.

6. The apparatus of claim 1 wherein said illumination source providing means comprises a collimated point source directed at the lens.

7. Apparatus for determining the focal length of a lens, said apparatus comprising:
    means for defining a photosensitive surface having an electrical characteristic which locally varies in accordance with the intensity of illumination incident thereto and for providing an analog electrical signal that varies in a predetermined sequence in accordance with the local value of said electrical characteristic of said photosensitive surface;

means for mounting a lens, the focal length of which is to be determined, in a predetermined manner with respect to said photosensitive surface so that the spacing between the lens and said photosensitive surface can be changed such that light emerging from the lens can impinge on said photosensitive surface and form thereon a pattern of illumination whose area varies in accordance with the spacing separating the lens and said photosensitive surface;

means for providing a collimated source of illumination directed at the lens, said photosensitive surface, said mounting means, and said illumination source providing means being arranged with respect to one another so that the area of the pattern of illumination formed by the lens on said photosensitive surface is smallest when the lens and said photosensitive surface are separated by a distance related in a predetermined manner to the lens focal length; and means for receiving said analog electrical signal and in response thereto providing an output response proportional to the size of the area of the pattern of illumination formed on said photosensitive surface so that the focal length of the lens can be determined as the distance separating the lens and said photosensitive surface is adjusted.

8. The apparatus of claim 7 wherein said first stated means comprises a television camera tube which includes said photosensitive surface on which light emerging from the lens impinges to form thereon said pattern of illumination and electronic circuit means for scanning said photosensitive surface in a predetermined pattern and rate to provide said electrical signal.

9. The apparatus of claim 7 wherein said last stated means comprises:
(a) clipping circuit means for receiving said electrical signal as an input and providing an output signal whose instantaneous value is limited to a predetermined level; and
(b) a DC voltmeter arranged to receive said clipping circuit means output signal, said DC voltmeter being operative to time average said clipping circuit means output signal and display said value of said time averaged signal, said displayed value of said time averaged signal being proportional to the area of said pattern of illumination formed on said photosensitive surface.

10. The apparatus of claim 9 wherein said first stated means recited in claim 7 comprises a television camera tube which includes said photosensitive surface on which light emerging from the lens impinges to form thereon said pattern of illumination and electronic circuit means for scanning said photosensitive surface in a predetermined pattern and rate to provide said electrical signal.

11. The apparatus of claim 10 wherein said DC voltmeter is selected to have a frequency response that is slower than said predetermined rate at which said television camera tube photosensitive surface is scanned and said predetermined scanning rate is selected to be faster than the rate at which the lens is adjusted.

12. A method for setting the focus of a lens for a predetermined object distance comprising the steps of:
providing a means for defining a photosensitive surface having an electrical characteristic which locally varies in accordance with the intensity of illumination incident thereto and for providing an analog electrical signal that varies in a predetermined sequence in accordance with the local value of said electrical characteristic of said photosensitive surface;

mounting a lens, the focus of which is to be set, in a predetermined manner with respect to said photosensitive surface such that light emerging from the lens can impinge on said photosensitive surface and form thereon a pattern of illumination whose area varies in accordance with the state of focus of the lens;

directing at the lens a source of illumination which effectively originates from the predetermined object distance for which the lens focus is to be set and arranging said photosensitive surface, the lens, and said illumination source providing means with respect to one another so that the best focus of the lens for the predetermined object distance occurs when the area of the pattern of illumination formed by the lens on said photosensitive surface is smallest; and measuring the size of the area of the pattern of illumination formed on said photosensitive surface by the lens as the lens focus is adjusted and selecting the best lens focus state as that where the area of the pattern of illumination is smallest.

13. The method of claim 12 wherein the size of the area of illumination formed by the lens is measured by means for receiving said analog electrical signal and in response thereto providing an output response proportional to the area of the pattern of illumination formed on said photosensitive surface.

14. The method of claim 12 wherein said means for defining said photosensitive surface and providing said analog electrical signal comprises a television camera tube which includes said photosensitive surface on which light emerging from the lens impinges to form thereon said pattern of illumination and electronic circuit means for scanning said photosensitive surface in a predetermined pattern and rate to provide said electrical signal.

15. The method of claim 14 wherein said area measuring and output response providing means comprises:
(a) clipping circuit means for receiving said electrical signal as an input and providing an output signal whose instantaneous value is limited to a predetermined level; and
(b) a DC voltmeter arranged to receive said clipping circuit means output signal, said DC voltmeter being operative to time average said clipping circuit means output signal and display said value of said time averaged signal, said displayed value of said time averaged signal being proportional to the area of said pattern of illumination formed on said photosensitive surface.

16. The method of claim 15 wherein said means for defining said photosensitive surface and providing said analog electrical signal comprises a television camera tube which includes said photosensitive surface on which light emerging from the lens impinges to form thereon said pattern of illumination and electronic circuit means for scanning said photosensitive surface in a predetermined pattern and rate to provide said electrical signal.

17. The method of claim 16 wherein said DC voltmeter is selected to have a frequency response that is slower than said predetermined rate at which said television camera tube photosensitive surface is scanned and said predetermined scanning rate is selected to be faster than the rate at which the lens focus is adjusted.

18. The method of claim 12 wherein said illumination source directed at the lens comprises a collimated point surce.

19. A method for determining the focal length of a lens comprising the steps of:

providing a means for defining a photosensitive surface having an electrical characteristic which locally varies in accordance with the intensity of illumination incident thereto and for providing an analog electrical signal that varies in a predetermined sequence in accordance with the local value of said electrical characteristic of said photosensitive surface;

mounting a lens, the focal length of which is to be set, in a predetermined manner with respect to said photosensitive surface so that the spacing between the lens and said photosensitive surface can be changed such that light emerging from the lens can impinge on said photosensitive surface and form thereon a pattern of illumination whose area varies in accordance with the spacing separating the lens and said photosensitive surface;

directing at the lens a collimated source of illumination and arranging said photosensitive surface, the lens, and said illumination source providing means with respect to one another so that the area of the pattern of illumination formed by the lens on said photosensitive surface is smallest when the lens and said photosensitive surface are separated by a distance related in a predetermined manner to the focal length of the lens;

measuring the size of the area of the pattern of illumination formed on said photosensitive surface as the distance separating the lens and said photosensitive surface is adjusted and determining that distance separating the lens from said photosensitive surface at which the area of the pattern of illumination is smallest to thereby determine the lens focal length.

20. The method of claim 19 wherein the size of the area of illumination formed by the lens is measured by means for receiving said analog electrical signal and in response thereto providing an output response proportional to the area of the pattern of illumination formed on said photosensitive surface.

21. The method of claim 19 wherein said means for defining said photosensitive surface and providing said analog electrical signal comprises a television camera tube which includes said photosensitive surface on which light emerging from the lens impinges to form thereon said pattern of illumination and electronic circuit means for scanning said photosensitive surface in a predetermined pattern and rate to provide said electrical signal.

22. The method of claim 21 wherein said area measuring and ouput response providing means comprises:

(a) clipping circuit means for receiving said electrical signal as an input and providing an output signal whose instantaneous value is limited to a predetermined level; and (b) a DC voltmeter arranged to receive said clipping circuit means output signal, said DC voltmeter being operative to time average said clipping circuit means output signal and display said value of said time averaged signal, said displayed value of said time averaged signal being proportional to the area of said pattern of illumination formed on said photosensitive surface.

* * * * *